L. H. ROGERS.
TUNNELING MACHINE.
APPLICATION FILED JAN. 3, 1911.
1,039,809.
Patented Oct. 1, 1912.
6 SHEETS—SHEET 1.
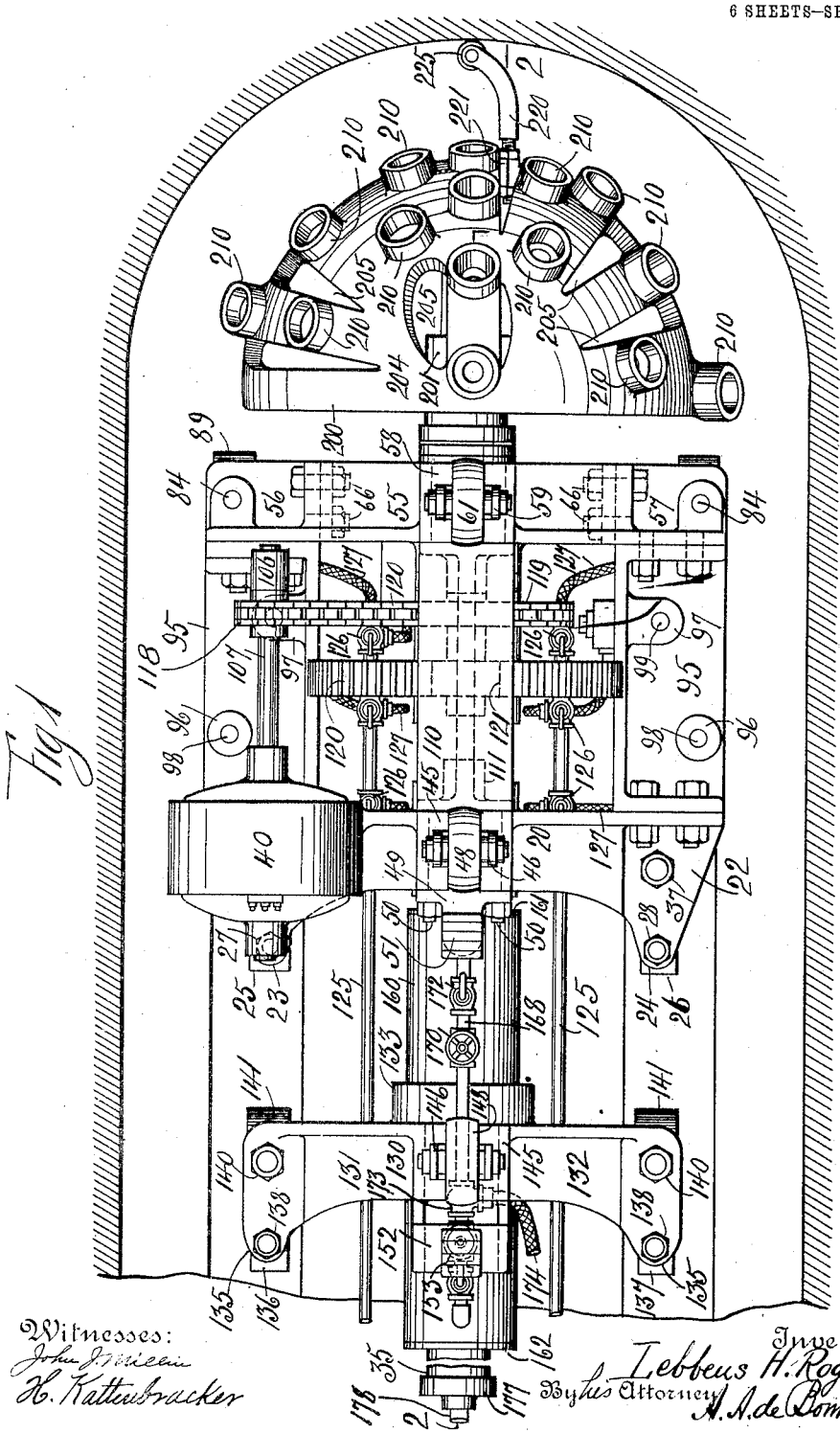

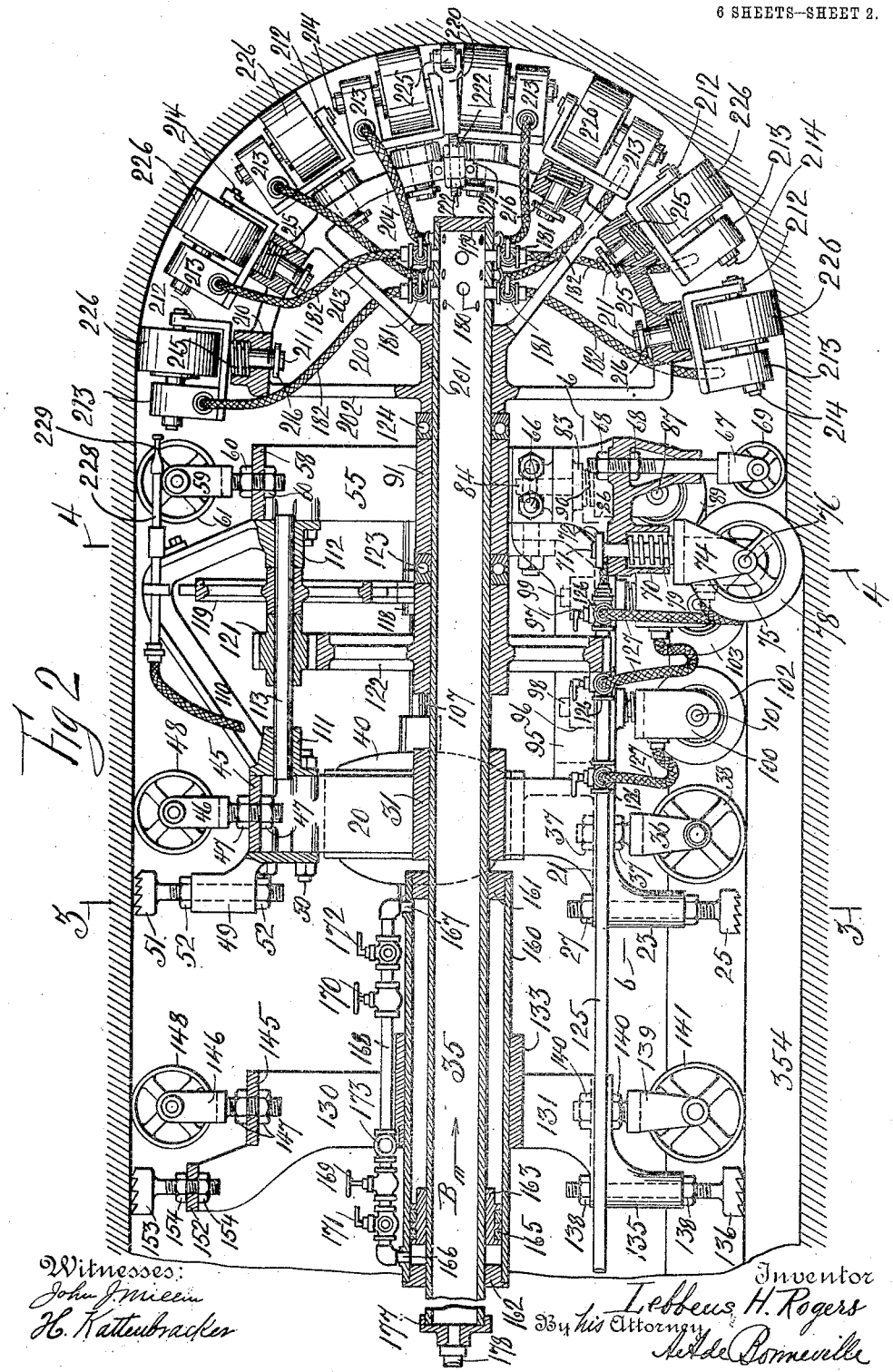

L. H. ROGERS.
TUNNELING MACHINE.
APPLICATION FILED JAN. 3, 1911.
1,039,809.
Patented Oct. 1, 1912.
6 SHEETS—SHEET 3.
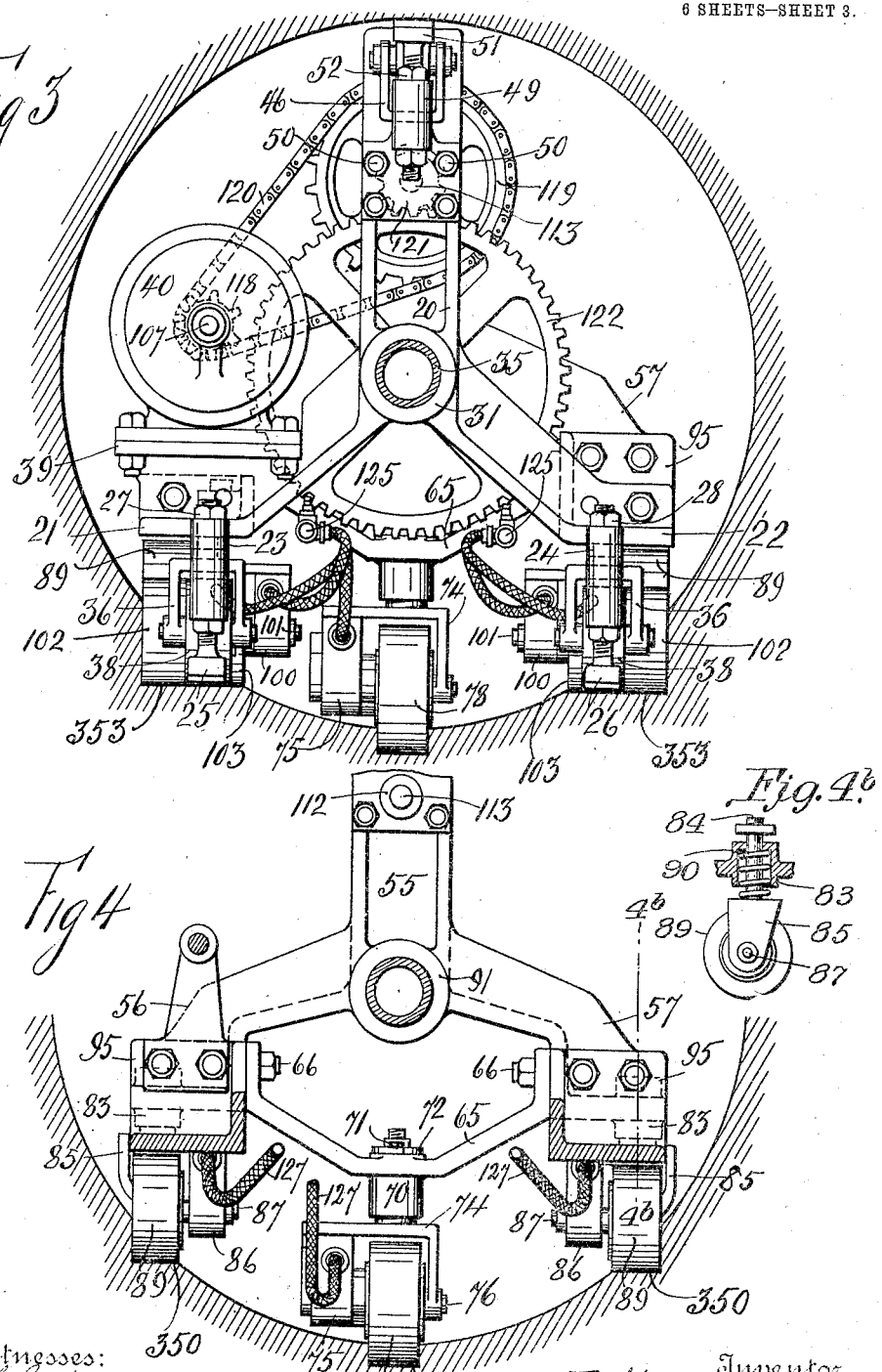

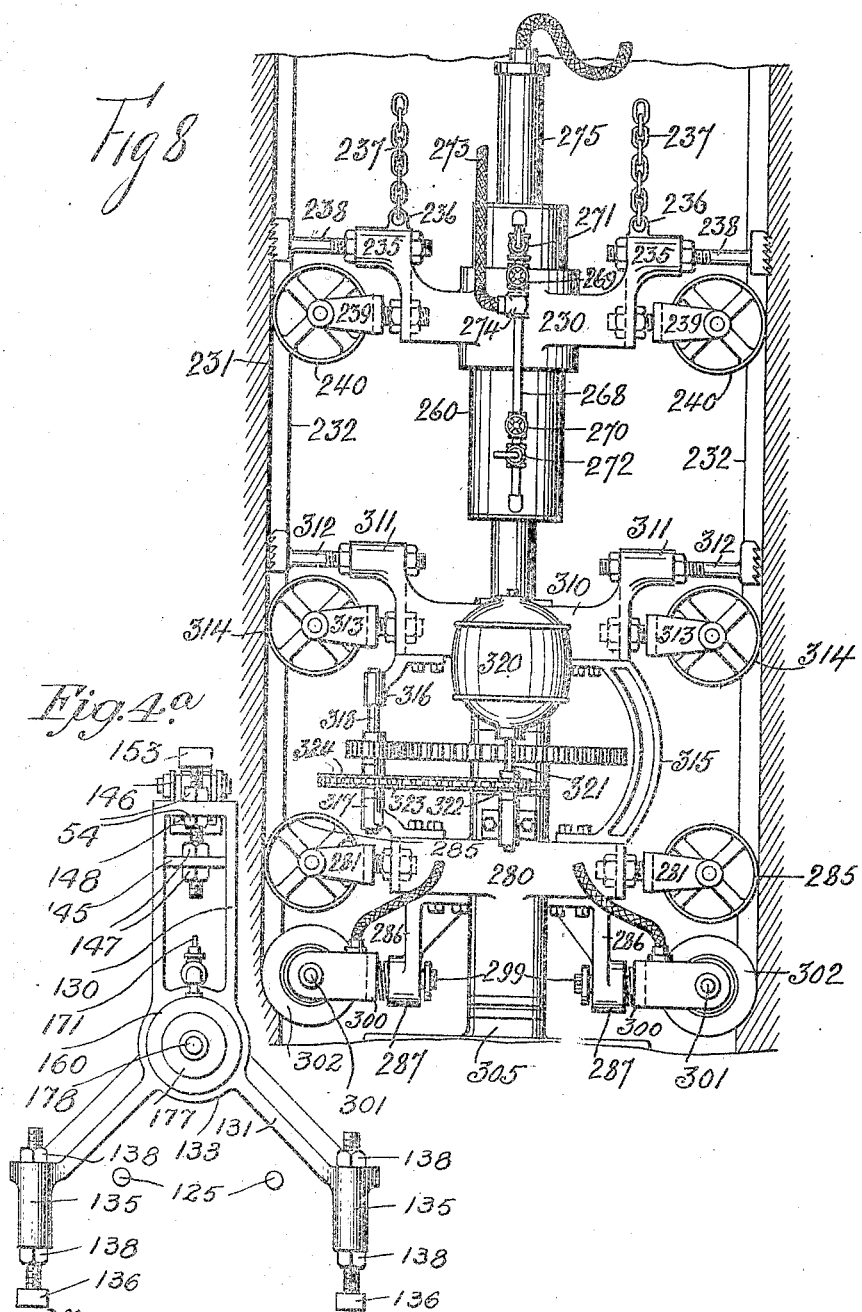

L. H. ROGERS.
TUNNELING MACHINE.
APPLICATION FILED JAN. 3, 1911.
1,039,809.
Patented Oct. 1, 1912.
6 SHEETS—SHEET 5.
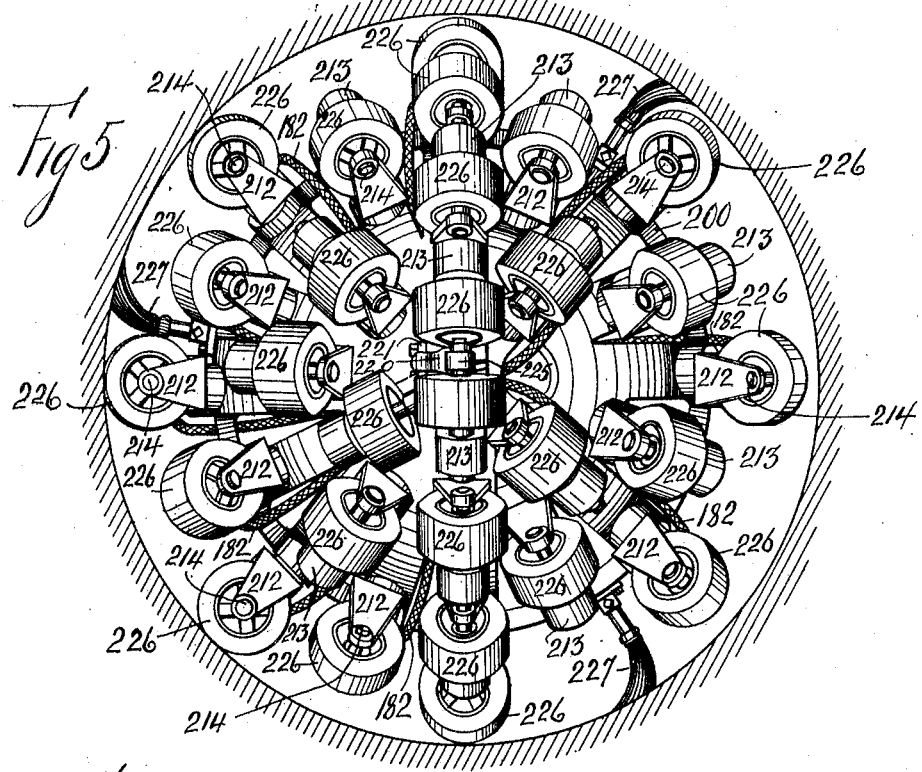
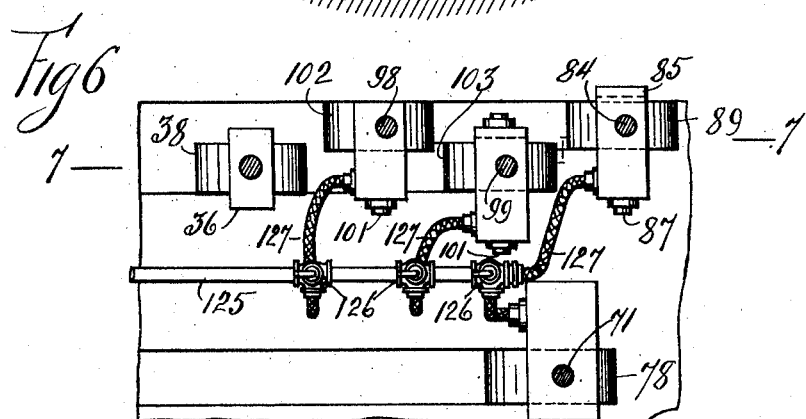
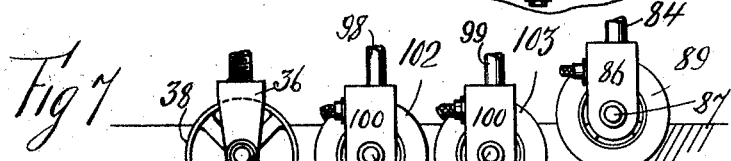

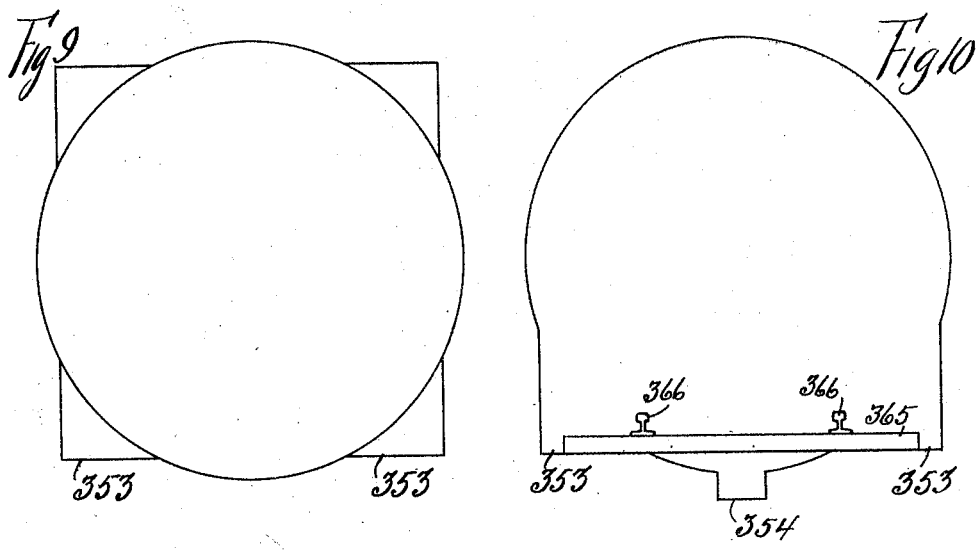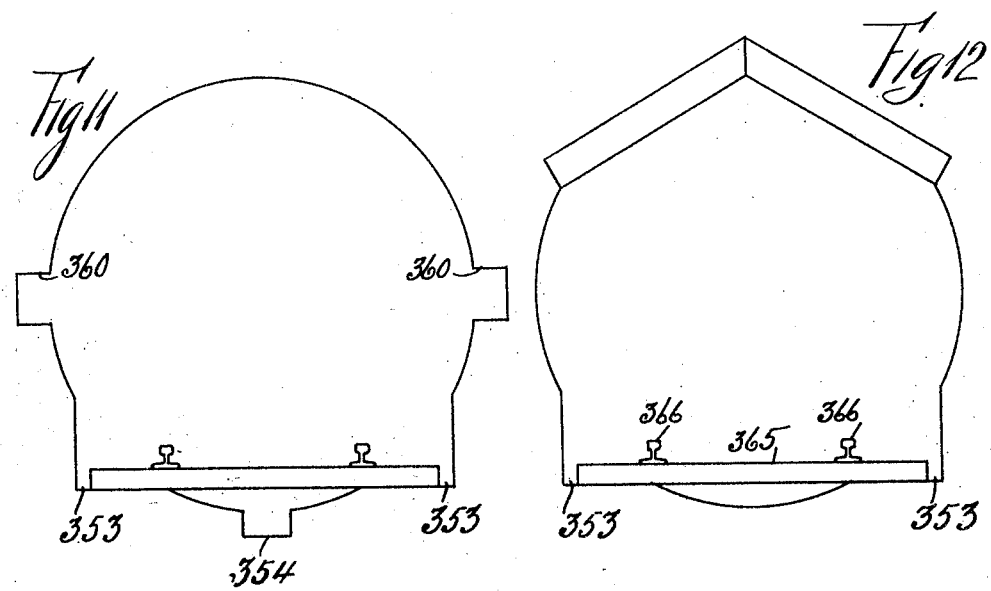

UNITED STATES PATENT OFFICE.

LEBBEUS H. ROGERS, OF NEW YORK, N. Y., ASSIGNOR TO CASE TUNNEL & ENGINEERING COMPANY, A CORPORATION OF ARIZONA.

TUNNELING-MACHINE.

1,039,809.   Specification of Letters Patent.   Patented Oct. 1, 1912.

Application filed January 3, 1911. Serial No. 600,568.

*To all whom it may concern:*

Be it known that I, LEBBEUS H. ROGERS, a citizen of the United States, and a resident of the borough of Manhattan, in the county of New York and State of New York, have invented certain new and useful Improvements in Tunneling-Machines, of which the following is a specification.

This invention relates to a tunneling machine and its object is the production of an apparatus which can bore a tunnel or sink a shaft either vertically up or down, horizontally or at an angle thereto.

It is characterized by rotating grinding wheels and rotating and revolving grinding wheels, the paths of some of the grinding wheels overlapping each other.

Figure 1 represents a partial plan view of a machine exemplifying the invention with a sectional view of a tunnel. Fig. 2 shows a partial longitudinal section as on a line 2, 2 of Fig. 1. Fig. 3 is a partial section of Fig. 2 on the line 3, 3. Fig. 4 shows a partial section of Fig. 2 on the line 4, 4, Fig. 4ª shows a partial left hand view of Fig. 2, Fig. 4ᵇ is a section of Fig. 4 on the line 4ᵇ, 4ᵇ, Fig. 5 represents a sectional view of a tunnel and an elevation of the front head of the machine, Fig. 6 shows a partial section of Fig. 2 on the broken line 6, 6, Fig. 7 is a section of Fig. 6 on the line 7, 7, Fig. 8 represents a partial elevation of the machine slightly modified in a vertical shaft, Fig. 9 is a diagrammatic section of a tunnel in which are shown rectangular corners, Fig. 10 is similar to Fig. 9 with the lower corners omitted and a gutter, Fig. 11 shows a tunnel with side guides and a central gutter, and Fig. 12 represents a tunnel with a roof of timber and lower rectangular corners.

The machine is represented to consist of a main central frame that comprises the rear end portion 20 with the legs 21 and 22. With the said legs are formed grip guides 23 and 24, which respectively support the adjustable grips 25 and 26 with the lock nuts 27 and 28. A bearing 31 is formed with the portion 20 to support the hollow shaft 35. Adjustable bearings 36 are clamped to the legs 21 and 22 by means of the lock nuts 37.

Supporting rollers 38 are carried on the supports 36. The leg 21 has formed therewith a bracket 39 for the motor 40. To the roof 45 of the portion 20 is connected an adjustable bearing 46 by means of the lock nuts 47. In the bearing 46 is journaled the upper guide roller 48. A grip guide 49 is bolted to the portion 20 by means of the studs 50, and a grip 51 is adjustably clamped in said grip guide by means of the lock nuts 52. A front portion 55 of said central frame similar to the portion 20, has formed therewith the legs 56 and 57. In the roof 58 of the portion 55 is clamped the adjustable bearing 59 by means of the lock nuts 60, and a guide roller 61 is journaled in said bearing 59. A connecting brace 65 is bolted to and between the legs 56 and 57, by means of the bolts 66. In the central portion of the brace 65 is secured the adjustable bearing 67 by means of the lock nuts 68. A guide roller 69 is journaled in the bearing 67. A cup 70 is formed with the connecting brace 65 and in which is adjustably located a spindle 71 with the nut 72. The spindle 71 has extending from its lower end the journal frame 74 from which extends the air motor 75. A shaft 76 from said motor has one end thereof journaled in the leg of the journal frame 74. A grinding wheel 78, preferably of carborundum, is supported on the shaft 76, and a spring 79 surrounding the spindle 71 bears between the upper face of the journal frame 74 and the roof of the cup 70. The axial line of the spindle 71 is horizontally distant from the axial line of the shaft 76.

From each of the legs 56 and 57 extend cups 83 similar to the cup 70 and which support spindle 84 similar to 71. A journal frame 85 extends from each of the spindles 84. A motor 86 is supported in each frame 85 and the shafts 87 of said motors have each one end thereof journaled in the legs of the frames 85. A grinding wheel 89 is fastened to each shaft 87, and springs 90 similar to 79 encircle the spindles 84. A bearing 91 is formed with the front portion 55 for the hollow shaft 35. Side connecting brackets 95 are bolted between the portions 20 and 55. Each of said connecting brackets 95 carry cups 96, 97 similar to 70 and in which are located spindles 98 and 99, that have connected thereto the journal frames that carry the motors 100. The shafts 101 of said motors carry the grinding wheels 102 and 103, and are laterally distant from the spindles 98 and 99.

A journal bearing 106 is bolted to one of the connecting brackets 95. The motor shaft 107 of the motor 40 has one end journaled in the bearing 106. A connecting brace 110 is bolted between the upper ends of the portions 20 and 55. It has formed therewith the bearings 111 and 112 for the counter shaft 113.

A sprocket pinion 118 on the motor shaft 107 is connected to the sprocket wheel 119 on the counter shaft 113 by means of the sprocket chain 120. A pinion 121 fastened to the counter shaft 113 meshes with the spur gear 122 fastened to the hollow shaft 35. Roller bearings 123 are located between the hub of the wheel 122 and the support 91. And roller bearings 124 are located between the support 91 and the sleeve of the front head to be described. Air pipes 125 have fitted up therewith stop valves 126, from which extend flexible conduits 127 that lead to the motors 75, 86 and 100.

A rear frame 130 has extending therefrom the legs 131 and 132 and has formed therewith the central support 133. A guide support 135 extends from each of the legs 131 and 132 that has clamped thereto the grips 136, 137 by means of the lock nuts 138. An adjustable bearing 139 is supported in each of the legs 131 and 132 by means of the lock nuts 140 and a guide roller 141 is journaled in each of the adjustable bearings 139. A main roof 145 is formed with the upper end of the said rear frame 130 and in which is supported an adjustable bearing 146 by means of the lock nuts 147. A guide roller 148 is journaled in the bearing 146. An upper roof 152 is formed with the rear frame 130 and has adjustably connected thereto the grip 153 by means of the lock nuts 154.

In the central support 133 is located a cylinder 160 with the front head 161 and rear head 162. The said heads fit tightly on the outer surface of the hollow shaft 35. A piston 163 with the packing rings 165 is fastened to the hollow shaft 35 and fits the inner cylindrical surface of the cylinder 160. A port 166 is formed at the rear end of the cylinder and a port 167 is formed at the forward end thereof. Piping 168 connects said ports and has connected therewith the valves 169, 170 and the threeway cocks 171 and 172. A T 173 is also connected with the piping 168 and to which leads the flexible conduit or hose 174.

The hollow shaft 35 at its rear end is closed with the cap 177, which has connected thereto a flexible conduit 178. The front end of the shaft 35 has the cap 179 and openings 180 which lead to stop valves 181, from which latter extend flexible conduits 182. On the front end of the hollow shaft 35 is supported the front head, designated generally by 200. It has the central sleeve 201 that is fastened to the shaft 35 and from which extend the ribs 202 and 203, which support the semi-spherical crown 204. The latter has a plurality of openings 205 to obtain access to the appurtenances connected up with said crown. Cups 210 extend from the outer surface of the crown in which are supported adjustable bearings that comprise the spindles 211 that carry the journal frames 212. Motors 213, and in this instance air motors, extend from the frames 212 and their shafts 214 have each of their ends journaled in the frames 212. A spring 215 located in each of the cups 210 surrounds the spindles 211 thereof, and the ends of each of said springs bear between the bottom of its cup and the said frame 212. A nut 216 is in threaded engagement with the outer end of each spindle 211. The conduits 182 have their ends connected to the said motors 213. Each spindle 211 is laterally distant from its motor shaft 214.

An adjustable curved journal bracket 220 with a threaded end is clamped to the crown 204 by means of a bracket 221, and is longitudinally adjustable in said bracket by means of the clamping nuts 222. In the outer end of the journal bracket 220 is journaled a head guide roller 225. The bracket 220 is curved so as to bring the roller out of the longitudinal axis of the machine when viewed as shown in Fig. 2 and its point of contact with the head of the tunnel may be at the intersection of said longitudinal axis and the head of the tunnel when viewed as shown in Fig. 1.

Carborundum grinding wheels 226 are fastened to shafts 214, the wheels 226 are disposed over the crown 204 so that when said head rotates their paths of contact with the head of the tunnel will overlap each other. The head 200 carries the cleaning brushes 227. A conduit 228 connected to the frame 110 has the nozzle 229.

In Fig. 8 the machine is slightly modified and is represented in a vertical shaft 231 with the side grooves 232. The rear frame of the machine is represented at 230 and has extending therefrom the guide supports 235 with the lugs 236, to which latter are attached the suspension chains 237. Grips 238 are adjustable clamped to the guide supports 235. Adjustable bearings 239 are clamped to the frame 230 and guide rollers 240 are journaled in said bearings 239. The cylinder 260 similar to 160 is guided in the frame 230 and has connected thereto the piping 268 with the valves 269, 270, and stop cocks 271, 272. A flexible conduit 273 leads to a T 274 in the piping 268. A hollow shaft 275 similar to 35 is guided in the cylinder 260.

A central frame slightly modified from the one already described, is shown to comprise the front portion 280 which has clamped thereto the adjustable bearings 281. Guide rollers 285 are journaled in the bearings 281. Journal brackets 286 with cups 287 similar to 70 are bolted to the front portion 280. Spindles 299 similar to 71 are guided in the cups 287 and have connected thereto journal frames 300 that carry motors with the shafts 301. Grinding wheels 302 are fastened to the shafts 301. A front head not shown, similar to 200 and having the central sleeve 305 is fastened to the hollow shaft 275. A rear portion of the central frame is shown at 310 and has formed therewith the guide supports 311, in which are adjustable clamped the grips 312. Adjustable bearings 313 are bolted to the rear portion 310 and have journaled thereon the guide rollers 314. A connecting frame 315 is bolted between the portions 280 and 310. A journal bracket 316 is bolted to the portion 310 and a journal bracket 317 is bolted to the portion 280. A spindle 318 is journaled in said brackets 316 and 317. A motor 320 is supported on the portion 310, and the shaft 321 of said motor carries a sprocket pinion 322 that carries a chain 323, which latter engages a sprocket wheel 324 that is fastened to the spindle 318.

To operate the machine and referring to Figs. 1 to 7, the grips 136 and 153 are respectively located to tightly bear against the floor and the roof of the tunnel. The motor 40 is started and the other parts of the machine are located as particularly shown in Fig. 2, the hollow shaft being under air pressure from the conduit 178. The motor rotates the shaft 35 and thereby the front head 200 is rotated. Air enters the T 173 through conduit 174 and flows through the valve 169 and also through the threeway cock 171 on its way into the cylinder 160, and thereby pushes the piston 163, with the shaft 35 to the right as shown by the arrow B. The threeway cock 172 is open to the atmosphere and the valve 170 closed, by virtue of which the air in the cylinder 160 on the right hand side of the piston 163 is discharged through said three way cock 172. While the hollow shaft is being moved to the front or head of the tunnel, the guide roller 225 bears against said head somewhat distant from the intersection of the axial line of the machine with the front or head of the tunnel. The grips 25, 26 and 51 do not bear respectively against the floor and roof of the tunnel during the movement of the shaft 35. The motor 40 rotating causes the shaft 35 and the head 200 with its appurtenances to rotate, the central frame with the portions 20 and 55 having only a movement in the axial direction of the tunnel with the longitudinal movement of the shaft 35. While the front head 200 is turning, air is supplied from the hollow shaft 35 to the flexible conduits 182, and the latter supply air to the motors 213, by reason of which the grinding wheels 226 are turned. The said wheels 226 are thus rotated and revolved at the same time, thereby grinding the head of the tunnel as the machine advances. While the hollow shaft 35 is rotating and advancing, compressed air from the air pipes 125 is delivered to the motors 86 to rotate the grinding wheels 89, to the motors 100 for the grinding wheels 102 and 103 and to the motor 75 for the grinding wheel 78. The front head 200 is moved in the direction of the arrow B, until the cap 177 is within a short distance of the rear head 162 of the cylinder 160. The operator next tightens the grips 25, 26 and 51 with the roof and floor of the tunnel, and allows the compressed air to enter the cylinder 160 through the valve 170 and three way cock 172, to move the cylinder 160 on the hollow shaft 35 in the direction of the said arrow B, the grips 136 and 153 having been loosened, by reason of which the rear frame 130 will be moved toward the central frame having the portions 20 and 55. Next the grips 136 and 153 are again tightened in place and the grips 25, 26 and 51 again loosened. During the operations of the machine the conduit 228 furnishes water for the head of the tunnel to wash the grindings therefrom, and the cleaning brushes 227 sweep the said head of the tunnel clean from all grindings due to the effects of the grinding wheels.

It will be noted that with the combination of the machine as shown in Figs. 1 to 8 that the grinding wheels 89 make the first longitudinal cut in the floor of the tunnel after the grinding wheels 226 in the head 200 have formed the main cylindrical portion thereof. The channels cut by said wheels 89 being indicated at 350. The grinding wheels 102 and 103 follow the channels 350 and cut the channels 353 forming the lower corners of the tunnel. These corners 353 are plainly indicated in Figs. 9 to 12. The wheel 78 cuts the gutter 354 in the floor of the tunnel and which carries away all the debris due to the operations of all the grinding wheels, by reason of the water directed against the head of the tunnel finding its way into said gutter.

The operation of the machine shown in Fig. 8 is similar to that already described. The construction of the head does not differ from the head 200, but as already described the central frame 280 has only connected thereto the grinding wheels 302 which cut the side grooves or guides 232. The chains 130

237 prevent accidents to the machine either when it is lowered or raised in the shaft 228.

In Figs. 10, 11 and 12 are shown ties 365 for tracks 366.

The grinding wheels of the apparatus described are carborundum and their accompanying motors are air motors, but it will be noted that the wheels may be made of other suitable materials which will grind the material to be operated upon, and the motors may be steam, electric, gas or of any other suitable type.

Having described my invention what I desire to secure by Letters Patent and claim is:—

1. In a tunneling machine the combination of a central frame, a hollow shaft journaled in the frame, means to conduct a fluid to the interior of said shaft, a front head fastened to said shaft, grinding wheels journaled on said head, motors connected to the wheels carried on the head, means to conduct the fluid from said shaft to said motors, a rear frame slidably connected to the shaft, a cylinder encircling said shaft and fastened to the rear frame, a piston in the cylinder connected to said shaft and means to lead a compressed fluid on either side of the piston.

2. In a tunneling machine the combination of a central frame, a hollow shaft journaled in the frame, a front head fastened to said shaft, grinding wheels journaled to the head, air motors on the head to rotate said wheels, a motor on the central frame, gearing interposed between the motor and the shaft to rotate the latter, grips adjustably connected to the central frame, a cylinder encircling the shaft, a rear frame supporting the cylinder, a piston in the cylinder fastened to the shaft, grips extending from the rear frame, supporting rollers and guide rollers journaled in each frame, means to inject compressed air into the shaft, means to lead compressed air into the cylinder on one side of the piston thereof to longitudinally move said shaft and on the other side thereof to longitudinally move the cylinder and therewith the rear frame.

3. In a tunneling machine the combination of a frame, a shaft journaled in the frame, means to rotate the shaft, a front head fastened to the shaft, spindles slidably supported in the front head, journal frame extending from the spindles, a flexible medium located between each journal frame and said head, a motor carried on each journal frame, a grinding wheel for each motor journaled in said frame, the axis of each grinding wheel laterally distant from the spindle of its journal frame.

4. In a tunneling machine the combination of a frame, a shaft journaled in the frame, means to move the shaft in the direction of its longitudinal axis, means to rotate the shaft while it is moving in the direction of its longitudinal axis, a front-head fastened to the shaft, a semi-spherical crown formed with the head, spindles slidably supported in the said crown, journal frames extending from said spindles, a grinding wheel journaled in each frame with its axis laterally distant from the axis of its corresponding spindle, the paths of the grinding wheels overlapping each other and motors for said grinding wheels.

5. In a tunneling machine the combination of a frame, means to lock said frame in place, a hollow shaft journaled in the frame, means to run the shaft in the direction of its longitudinal axis, means to rotate the shaft, a front head fastened to the shaft, a semi-spherical crown formed with the head, spindles slidably supported in said crown, journal frames extending from said spindles, a spring surrounding each spindle bearing between the said crown and its journal frame, a nut engaging a threaded end on each spindle, a grinding wheel journaled in each journal frame, an air motor extending from each journal frame and connected to its accompanying grinding wheel, stop valves extending from openings in said hollow shaft, conduits connecting said valves with the air motors, and means to feed a fluid into said hollow shaft.

6. In a tunneling machine the combination of a central frame, a shaft journaled in said frame, a front head fastened to the shaft, grinding wheels adjustably supported on the head, motors connected up with the grinding wheels, cleaning brushes extending from the front head, journal frames slidably supported in said central frame, a motor on each of the latter frames connected up with its accompanying grinding wheel, guide rollers extending from the central frame, a conduit for water connected with the machine to spray and clean the head of a tunnel in which the machine operates and means to clamp the central frame in position in said tunnel.

7. In a tunneling machine the combination of a central frame, grips connected to said frame to hold it in place in a tunnel, rollers extending from said frame, a hollow shaft journaled in said frame, a motor carried on the frame, connections between the motor and said shaft, a front head fastened to the hollow shaft, journal frames adjustably connected to said head, grinding wheels journaled in said journal frames, a motor on each journal frame for its accompanying grinding wheel, a rear frame for the machine, grips extending from the rear frame, rollers journaled in the rear frame, a cylinder supported by the rear frame and encircling said hollow shaft, a piston within the cylinder and fastened to the hollow shaft, conduits connecting openings in the hollow shaft with the motors on the front head, means to conduct compressed air to the hollow shaft and means to conduct compressed air to the said cylinder on either side of its piston.

Signed at the borough of Manhattan in the county of New York and State of New York this 31st day of December A. D. 1910.

LEBBEUS H. ROGERS.

Witnesses:
W. H. BOWIE,
M. ENGELSMAR.